March 10, 1970 H. L. FUNK ET AL 3,500,323

HANDWRITTEN CHARACTER RECOGNITION APPARATUS

Filed Dec. 6, 1965 7 Sheets-Sheet 1

*INVENTORS*
HOWARD L. FUNK
STANLEY F. KAMBIC

*BY* Robert E. Sandt
ATTORNEY

March 10, 1970 H. L. FUNK ET AL 3,500,323

HANDWRITTEN CHARACTER RECOGNITION APPARATUS

Filed Dec. 6, 1965 7 Sheets-Sheet 2

HANDWRITTEN CHARACTER RECOGNITION APPARATUS

Filed Dec. 6, 1965 7 Sheets-Sheet 5

HANDWRITTEN CHARACTER RECOGNITION APPARATUS

Filed Dec. 6, 1965 7 Sheets-Sheet 6

United States Patent Office 3,500,323 Patented Mar. 10, 1970

3,500,323
HANDWRITTEN CHARACTER RECOGNITION APPARATUS

Howard L. Funk and Stanley F. Kambic, Yorktown Heights, N.Y., assignors to International Business Machines Corporation, Armonk, N.Y., a corporation of New York Filed Dec. 6, 1965, Ser. No. 511,816
Int. Cl. G06k 9/00
U.S. Cl. 340—146.3 10 Claims

ABSTRACT OF THE DISCLOSURE

Hard copy stationery with preprinted constraint lettering guide patterns is aligned on a writing table over which a pantograph and resolver is moved in response to forming the characters with a writing instrument in the prescribed sequence of line crossings of the lettering guide patterns. Horizontal and vertical shaft position encoders produce impulses upon each crossing of the line of the constraint lettering guide patterns. Through circuitry and geometry of the emitter various densities (1; ¼; 1⁄16; ⅑) of printing forms may be employed. Recognition is achieved by assigning ternary weights to each of the lines in a three line constraint pattern (or quaternary weights for a four line pattern, etc.) and shifting one ternary order for each successive line crossing, and adding the values of the respective ternary weights to produce a decimal number definitive of each separate character.

This invention relates to an apparatus for and method of character identification, particularly for the identification of handwritten lexical symbols as they are being formed.

The increase in the use of data processing equipment has given rise to an increased need for direct data entry into the computer facility or for the preparation of machine-processable records concurrent with the preparation of the more conventional human readable business instruments. While there are many apparatuses, as for example a typewriter with an attached punch or magnetic recorder, for preparing the dual records, these are frequently cumbersome and expensive. So, too, are apparatuses known for reading a document after it has been prepared. This latter class of apparatus is also complicated and expensive, particularly where handwritten lexical symbols must be identified. However, while handwriting is individual to the person and difficult of machine reading, it does have one unique characteristic. That characteristic is the sequence of strokes that form the symbol. In no other form of printing is this to be found. The present invention exploits that characteristic by analyzing not only the spatial distribution of the strokes, but also the direction in which they were formed, to yield a method of and apparatus for identifying a handwritten lexical symbol with a high degree of definition. This is achieved by requiring the writer to form the characters in prescribed areas of the document and in a predetermined sequence of strokes whose direction and length are referenced to a preprinted geometric pattern. When each character is thus written, the apparatus detects the sequential crossings of the lines constituting the geometric pattern and translates these into character identifying signals.

In prior are devices of this general nature, the line crossings were detected by contact members arranged in the configuration of the geometric pattern constraint, and a writing stylus made an electrical connection sequentially with each of the contact members as the character was stroked. Not only does this form of apparatus dictate a character of fixed size, but also it precludes the direct production of a conventional handwritten document comprised of completed words and sentences arranged in conventional spaced lines. The present invention obviates these shortcomings by employing a motion repeater attached to the writing instrument, and by providing a plurality of line crossing detectors removed from the writing area and actuated by the motion repeater, to permit a complete conventional document to be written while the apparatus signals the formation of each successive symbol for entry into a data processing system. In addition because of the exteriorly located line detectors, various document formats may be accommodated, whereby various character sizes and spacings can be processed.

In its simplest form the invention comprises the forming of characters in a prescribed manner upon a succession of spaced geometric patterns, preprinted upon the document form itself, each consisting of a vertical line crossed by two spaced parallel lines. As the writnig instrument crosses the three lines in the prescribed manner, the crossings are detected and assigned a weighted value in accordance with the line crossed, and the sequence of the crossings. In the three line system, the lines are assigned the ternary values of 0, 1 and 2, and each line crossing effects a shift of one order in the ternary series. Thus, each character, when properly formed, generates a unique ternary number, which when converted to the decimal system generates a unique decimal number for each different symbol. For a three line ternary system and seven line crossings, for example, 2186 discrete combinations could theoretically be generated. These, however, are never realized in actual practice. For a system of N lines operating in a numeration system to the radix N, the resolution can be appropriately increased or decreased, with correspondingly greater or lesser restraints upon the writer.

In the system, as above described, the method not only produces a human readable document for ready use, but also produces direct entry of data into data processing equipment while the document is being prepared, just by the simple expedient of stroking a pencil (or equivalent writing instrument) over the document in the prescribed manner. A further refinement of the apparatus permits the immediate check upon the writer's character formation by displaying to him the machine's identification of the symbol as he writes it. This permits him to correct any errors immediately.

In the light of the foregoing introductory remarks, it is therefore an object of this invention to provide a method of and apparatus for identifying handwritten lexical symbols as they are being written by detecting the sequence of line crossings of a geometric pattern upon which the symbol is written and assigning wighted values to the crossings and the sequence in which they were effected.

A further object is to provide a method of and apparatus for identifying a handwritten lexical symbol as it is written in a prescribed manner upon a geometric pattern having N crossing lines, each of which lines has a unique assign value in the numeration system in the radix N. and defining the character thus formed by a multi-ordered number in the N-radix system having orders equal to the number of lines crossed.

Yet another object is to provide an apparatus which detects the sequence of line crossings effected by a writing instrument as it forms a lexical symbol in a predetermined sequence of strokes which are spatially oriented with respect to a given geometric pattern.

Still another object is to provide an apparatus for analyzing the sequence of line crossings effected by a writing instrument guided in a constrained handwriting upon a document having preprinted character forming guide patterns in predetermined locations on the document surface, wherein the guide patterns may be varied in size and relative spacing to accommodate a variety of document formats.

A final and specific object is to provide a method of and apparatus for identifying handwritten lexical symbols written in a constrained fashion upon a geometric pattern consisting of one vertical line crossed by two spaced lines wherein the lines are assigned ternary weights and the sequence in which they are crossed produces a multi-ordered ternary number having a number of orders equal to the number of lines crossed by the writing instrument.

The foregoing and other objects, features and advantages of the invention will be apparent from the following more particular description of preferred embodiments of the invention, as illustrated in the accompanying drawings.

Figure 1:
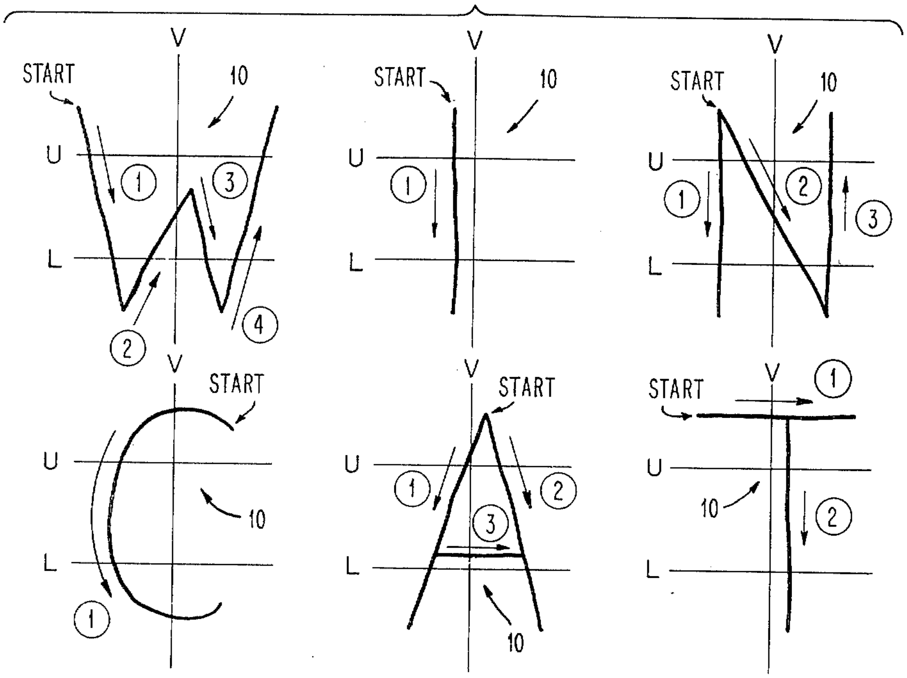
FIG. 1 shows the sequence of strokes relative to the writing guide necessary to form six letters in the ternary system.

In FIG. 1 the principle of the invention which is implemented by the apparatus to be described is illustrated. Here the geometric pattern 10 is shown consisting of the vertical line V, the upper horizontal line U, and the lower horizontal line L. All of the lexical symbols are formed with reference to this pattern or grid. This grid is in practice printed in light colored ink upon the document page, and the operator is trained to form the symbols in a prescribed orderly manner.

In the first illustration the word "win" is formed by the succession of strokes starting from the "start" arrow and labelled with the encircled numbers. The W is a four stroke letter with seven crossings, and should not be symmetrically disposed with respect to the vertical line, lest the strokes cross the vertical line twice giving rise to a false analysis. With the succession of strokes and orientation shown, the sequence of line crossings for the letter W is ULLVLLU. If the lines are assigned the ternary weights as follows, U=0; L=1; V=2, then the letter W may be translated to a ternary number as follows:

W=ULLVLLU=0112110

If the left-most digit is considered as the lowest order, then the letter W may be converted to a unique decimal number by addition of the requisite values from the following table.

| | | | | | | | |
|---|---|---|---|---|---|---|---|
| +0 | 0 | 0 | 0 | 0 | 0 | +0 | 3<br>9 |
| 1 | +3 | +9 | 27 | +81 | +243 | 729 | 54<br>81 |
| 2 | 6 | 18 | +54 | 162 | 486 | 1458 | 243 |
| | | | | | | | 388 |

By application of the same principles the single stroke "I" may be translated as follows:

I=UL=01=3

The single vertical stroke is formed off center to preclude intersection with the vertical line.

The three stroke letter N, formed as shown gives rise to the following sequence and conversion:

N=ULUVLLU=0102110=381

By similar analysis, the letters C, A and T may be translated as follows:

C=VULV=2012=65
A=VULULV=201012=578
T=VUL=201=11

From the foregoing representative analysis it will readily be appreciated that considerable latitude in the configuration of the various characters is possible, so long as the proper sequence of line crossings is achieved. It is also apparent that, while the ternary weights of the lines are fixed, the number of orders in the resultant ternary number is a direct function of the number of line crossings, varying from two to seven in the examples chosen.

A complete tabulation of the ternary numbers and equivalent decimal values for the alphabet is as follows:

I=UL=01=3
L=ULV=012=21
T=VUL=201=11
C=VULV=2012=65
F=ULVV=0122=75
J=ULVL=0121=48
Y=UVUL=0201=33
E=ULVVV=01222=237
H=ULULV=01012=192
P=ULVUV=01202=183
S=VUVLV=20212=209
U=ULVLU=01210=48
V=ULVUL=01201=102
A=VULULV=201012=578
D=ULVULV=012012=588
G=VULVLV=201212=632
K=ULUVVL=010221=462
O=VULVLU=201201=308
R=ULVUVL=212021=428
X=UVLUVL=021021=420
Z=VUVLVV=202122=695
M=ULUVUUL=0102001=786
N=ULUVLLU=0102110=381
Q=VULVLUL=2012101=875
W=ULLVLLU=0112110=388

It is also apparent that a certain amount of ambiguity will arise between alphabetic and numeric characters. The most apparent of the conflicts is between a numeral "1" and the letter I. So also will the numeral "0" be confused with the letter O. Other confusions will arise between the letter S and the numeral "2" if these be formed in the normal manner. Both yield crossings of VUVLV. Similarly the G and "6," the T and "7" will, if normally formed give rise to confusion. One solution is to form one of the conflicting characters in the reverse direction. The "2," for example, if formed from the bottom up, would yield VLVUV (the reverse of S) and would product a unique output. A second expedient would be to employ a "case shift" button, so to speak, on the writing instrument, which would be depressed if a numeral were about to be written. A third expedient would be to incorporate the "case shift" switch in the apparatus by permitting a document format control to assign specific areas of the document to numerical recording.

Figure 2:
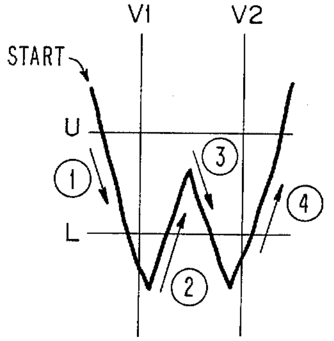
FIG. 2 shows the writing guide for a quaternary system and the formation of the letter W thereon.

Before turning to a description of the apparatus for implementing the foregoing relationships, it is well to digress briefly and explore the relationships obtained by using four lines and a numeration system for the radix four. This will exemplify the extrapolations of the preferred embodiment of the invention which can be made. In FIG. 2 a four line grid is shown, formed much in the fashion of a tick-tack-toe game board. If the lines are labelled L for lower, U for upper, V1 for the left vertical and V2 for the right vertical and the respective quaternary values 0, 1, 2 and 3 assigned thereto, the letter W stroked as shown in FIG. 2 would yield the sequence:

W=ULV1LLV2LU=10200301

This sequence, when equated to the quaternary decimal equivalent series as follows,

| 0 | +0 | 0 | +0 | +0 | 0 | +0 | 0 |
|---|---|---|---|---|---|---|---|
| +1 | 4 | 16 | 64 | 256 | 1024 | 4096 | +16384 |
| 2 | 8 | +32 | 128 | 512 | 2048 | 8192 | 32768 |
| 3 | 12 | 48 | 192 | 768 | +3072 | 12288 | 49152 |

yields a decimal value of 19,489. Other similar values may be achieved for the remaining symbols of the alphabet.

Figure 3:
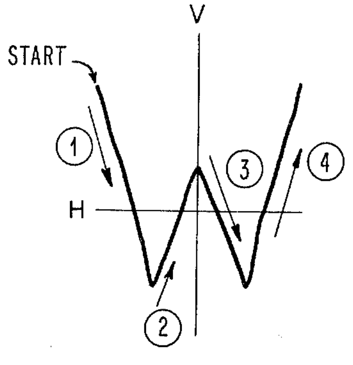
FIG. 3 shows a binary guide system and a letter W formed thereon.

Proceeding to a system with less definition, the binary notation of FIG. 3 may similarly be employed. The letter W formed on a cross as shown yields the following binary series and equivalent decimal value:

W=HHVHH=00100=4

Returning now to the preferred ternary system and rearranging the data base, it will readily be appreciated that the sequence of crossings, in addition to being susceptible to conversion to unique decimal numbers, can also be converted to a nomenclature which can readily be decoded by a conventional decoding matrix. The W in FIG. 1 (ternary system) may be represented as follows:

| | | | | | | | |
|---|---|---|---|---|---|---|---|
| U Register | 1 | 0 | 0 | 0 | 0 | 0 | 1 |
| L Register | 0 | 1 | 1 | 0 | 1 | 1 | 0 |
| V Register | 0 | 0 | 0 | 1 | 0 | 0 | 0 |

The letter I may be represented as:

| | | | | | | | |
|---|---|---|---|---|---|---|---|
| U Register | 1 | 0 | 0 | 0 | 0 | 0 | 0 |
| L Register | 0 | 1 | 0 | 0 | 0 | 0 | 0 |
| V Register | 0 | 0 | 0 | 0 | 0 | 0 | 0 |

The letter N may be represented as:

| | | | | | | | |
|---|---|---|---|---|---|---|---|
| U Register | 1 | 0 | 0 | 0 | 0 | 0 | 1 |
| L Register | 0 | 1 | 0 | 0 | 1 | 1 | 0 |
| V Register | 0 | 0 | 0 | 1 | 0 | 0 | 0 |

It will be noted that the foregoing notation produces only one ternary notation per order, and that the ternary notation becomes in essence three parallel binary notations. Since binary notations are simple to implement with "on-off" bistable elements, the foregoing characters can be simply manifested by the respective stability states of twenty-one bistable elements. These elements can then be wired into a simple decoding matrix to provide the requisite identifictaion.

Figure 4:
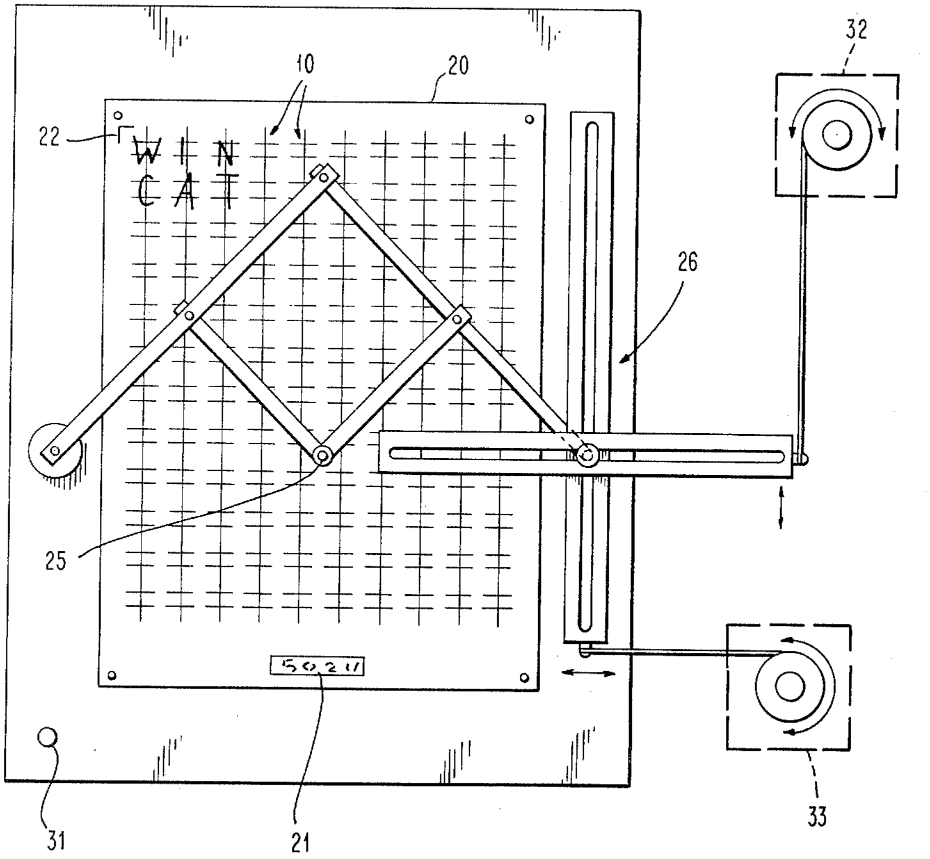
FIG. 4 shows a schematic drawing of the organization of the mechanical aspects of the invention.

Turning now to the apparatus for following the character trace, translating it into line crossings, and converting it into character identification, reference is first made to FIG. 4. Here the document 20 provided with indicia 21 which identify the document format as to size of letters, spacing between letters, and the various areas delineated to receive alphabetic and numeric data entries. These indicia may be coded for automatic sensing by the reading device itself, or may be a simple form number which the operator will key into the system. The entry of this format identification, however achieved, will adjust the operation of the apparatus compatibly with the format of the document being written upon. This document identification also serves to adjust the operation of any data processing system to process the input data which is being generated by the character identification device in a manner consistent with the nature of the data. For example, a merchandise sales slip would require a different processing than a request for additional merchandise stock, or an inventory status inquiry. The document 20, together with its preprinted format identification 21, and writing constraining guide lines 10 (the same as in FIG. 1), in the pre-ordained printing positions, is fixed on the writing table by means of fixed pins, or clips, to locate its position and prevent shifting. If the form is rolled from a supply roll within the apparatus, the roll core may contain the form identification indicia, and the document forms will be joined and provided with indexing marks to align the forms with appropriate marks on the writing table. The document must be registered accurately in both the horizontal and vertical directions on the table so that the remote line crossing detectors may be synchronized with the guide line patterns 10.

The guide line patterns 10, preprinted in a light colored ink upon the document form 20 so as not to obscure the handwritten symbols, have prescribed dimensions and spacings which are related to the document format. This permits the writing of various sizes of characters and variable spacing, hereinafter referred to as "recording density." The maximum density is achieved with small closely spaced characters. The recording density is consistent within any one document and is adjusted in accordance with the document format identification indicia 21.

For ease of understanding the size and spacing relationships of the guide patterns 10 necessary to achieve variable recording density, the following basic unit dimensions will be assumed for the maximum recording density:

X=the horizontal pitch of the characters, viz, the distance between vertical lines V of successive characters in a line.

Y=the vertical pitch of the characters, viz, the distance from the horizontal line U to the next lower line U.

⅔X=the lengths of the lines U and L.

Y=the length of the line V.

⅓Y=the distance of the line U from the upper end of line V; the spacing between the lines U and L; the distance of the line L from the bottom of the line V.

With the foregoing relationships it will be appreciated that, assuming each character is formed within a rectangle having a width of ⅔X and a height of Y, there will be a horizontal spacing between characters of ⅓X, and substantially no vertical spacing between characters, except that they would conventionally be formed slightly smaller than the maximum size. For a purpose to be described, it will be assumed that there is a third hypothetical horizontal line P (not printed on the form) as a vertical pitch line disposed as an interface between adjacent vertical characters.

With the above relationships fixed, it is now possible to explore the derived relationships necessary to obtain variable density recording under document format control. The easiest relationship to comprehend is that of horizontal pitch. Since there is only one vertical line in the guide pattern 10, any decrease in recording density merely effects a simple magnification in the spacing between successive vertical lines V. For example, for ¼ density printing (twice linear magnification) the spacing between successive lines V becomes 2X. For ⅑ density the spacing becomes 3X. Therefore, if an emitter is employed to detect line crossings the selection of every pulse for full density recording, every other pulse for ¼ density recording, and every third pulse for ⅑ density recording will provide the requisite vertical line crossing detections for each of these recording densities.

Figure 5:
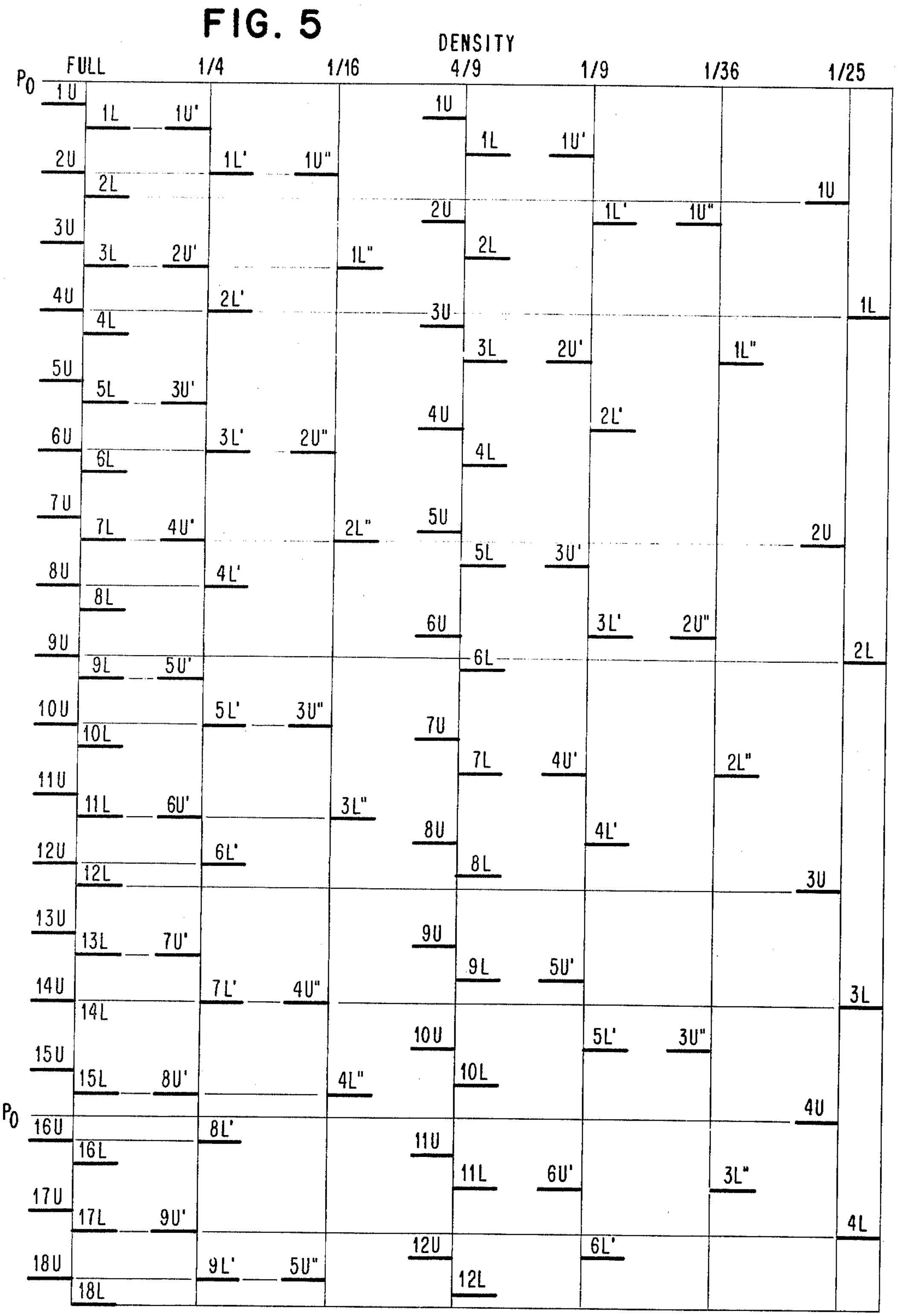
FIG. 5 shows a linear development of the vertical movement incremental shaft position encoders and relativity of the frequency division of the outputs therefrom.

Because there are two horizontal lines U and L per guide pattern 10, which lines are spaced at ⅓ the vertical pitch, the relationships in the vertical direction necessary to achieve variable recording density become more complicated. Reference to FIG. 5 shows the relative spacing of the horizontal guide lines U and L for various degrees of recording density. The full density recording is shown in the first vertical plot. Linear magnification of 2 (¼ print density) is shown in the second vertical plot. It will be noted that, although the pitch is doubled, the phase of the lines U and L is shifted. Thus an upper line in ¼ density recording aligns with every other lower line in the full density recording scale. Thus, if a common external line crossing detector is employed for both these magnifications, it will have to reverse the significance of the upper and lower lines as well as counting every other line for the ¼ density document. For 1/16 density recording (4 linear magnifications) the phase is returned to that of the full density recording and every fourth line provides the requisite resolution.

When odd linear magnification is attempted, the resolution of the U and L lines is obscured. For example, for a magnification of 3 (1/9 density), shown in the fifth line the upper lines U and lower lines L align only with the hypothetical pitch lines P of the full density scale. This would result in an ambiguity in detecting horizontal line crossings for this magnification. This difficulty is obviated by employing an emitter constructed at 1½ scale, the spacings of the fiducial marks being shown in the fourth vertical plot. While these marks do not align with the corresponding U and L marks in the full density scale, the pitch lines P do align with every third pitch line P in the full density scale. This gives rise, at least to a cyclical relationship of every third character. The 3 magnification character lines now align with the 1½ magnification character lines in the same manner as the 2X characters aligned with the 1X characters. In addition to the foregoing advantage, the expedient permits of a finer gradation of character magnifications viz, 1:1½:2:3:4:5. The 5 magnification scale is shown in the righthand plot. By exchanging the significance of the U and V and further frequency division other derived magnifications of 6X, 8X, and 10X may be derived from the relationships shown. A magnification of 7X would require an additional scale.

Since, as will be explained, incremental shaft position encoders are to be employed, it is necessary to find a pitch line position which will provide a common cyclical reference for all of the basic scales which are to be employed. Since, in the example shown scales of 1, 1½, and 5 are to be employed, visual inspection of FIG. 5 will reveal that the three scales are cyclical after fifteen full density characters, 10 1.5X characters, and 3 5X characters. This is to be expected since the lowest common integral denominator of 1, 1.5 and 5 is fifteen. The incremental shaft encoders must, therefore, resolve these numbers of characters in each of the selected scales before they recycle. The multiples of the basic scales will not be affected by the recycling.

Returning now to FIG. 4 and the means necessary to implement the relationships which have been set forth in detail above, a motion repeater in the form of a pantograph 26 overlies the document 20 and is so proportioned as to cover the total document area. This pantograph has attached thereto a writing instrument 25 with a fixed writing angle. This instrument is provided with a pressure sensitive switch 29 (not shown in FIG. 4) which is closed when the instrument is in writing contact with the document. A further switch 30 (also not shown) may be located on the writing instrument or elsewhere convenient to the operator to signal that the character has been completely formed. This switch can also be pressure sensitive (with greater pressure than switch 29) or can be squeeze responsive. A third switch 31 provides for numeral identification (case shift) if this feature is not incorporated in the format control.

The pantograph linkage 26 connects through appropriate linkage, shafts, and gearing (not shown) within the apparatus to resolve the horizontal and vertical movements of the writing instrument 25 into corresponding proportionate rotations of a horizontal incremental shaft encoder 32 and vertical incremental shaft encoder 33. These encoders are preferably opaque discs with a plurality of concentric circular arrays of transparent slits together with appropriate light sources and photocells.

The horizontal shaft encoder 32 is provided with three concentric scales of evenly spaced indexing marks representing respectively from outside in linear magnifications of 1, 1½, and 5. Because the lowest integral common denominator of these is 15, the outer scale must contain 15 marks as a minimum, the middle scale 10, and the inner scale 3 marks to preserve the relativity. The mark spacings for three scales will thus be 24°, 36°, and 120° respectively. Assuming radially aligned photocells, the three scales will be aligned clockwise relative to a common base line by respective phase displacements of 16°, 24°, and 80°. If a greater number of marks per scale (45, 30, and 9, for example), the angular relationships will be divided by the appropriate scale factor. The relative position of the scales on the disc will also very in accordance with the relative angular spacing of the photocells that sense the passage of the indexing marks. These are preferably staggered to achieve minimum disc size. As a consequence, the three scales would appropriately phased to provide an indexing pulse for each line crossing in the corresponding document scale. The gearing is chosen such that the disc will rotate through the requisite number of revolutions for a complete page. If an 8½" page width and 3/16" horizontal pitch is assumed, then the page can receive 45 characters at full density. This requires three revolutions of the disc. Whatever parameters are chosen, the emitter 32 will emit a pulse for each vertical mark V for document sizes of 1, 1½, and 5 linear magnifications.

The vertical encoder 33 because of the spacing relationships of the upper and lower lines U and V shown in FIG. 5 becomes slightly more complicated. Again, three concentric scales are employed for the 1, 1½, and 5 times linear magnifications containing respectively 15, 10, and 3 marks each, or integral multiples thereof. Each scale, however, will have two photocells coacting therewith to provide the requisite upper and lower line signals. If it is assumed that the outer scale contains 15 marks at 24° then the upper and lower photocells will be displaced by 8° to provide the requisite pulse timing. Corresponding spacing of the paired photocells for the middle scale will be 12°, and for the inner scale 40°. These scales are all referenced to a base line $P_0$ as shown in FIG. 5, which represents an effective linear development of the circular scales. It will be noted that the scales repeat at $P_0$.

A design feature that may be employed to permit a staggered photocell array is to double the number of marks in each scale to 30, 20, and 6, and arrange the three pairs of photocells symmetrically with respect to three diameters which divide the circle into six sectors. The outer pair of photocells in this instance will lead and lag their diametric line by ±2°. The middle scale photocells will be disposed at ±3° relative to their diameter, and the inner photocells at ±10°. The phase of the three photocell pairs thus becomes 4°, 6°, and 20°, which are respectively ⅓ of the pitch angles of 12°, 18°, and 60° representing the appropriate document magnifications. Since the three scales repeat twice per revolution the requisite integral relationship is preserved.

With the foregoing relationships the horizontal emitter 32 and vertical emitter 33 will emit pulses for line crossings of V, U, L in the three scales. Pulses representing only one scale at a time will be gated to the utilization circuits where they will either be used directly or will be subjected to frequency divisions to obtain the further magnifications of 2, 3, 4, and 6.

Figure 6A:
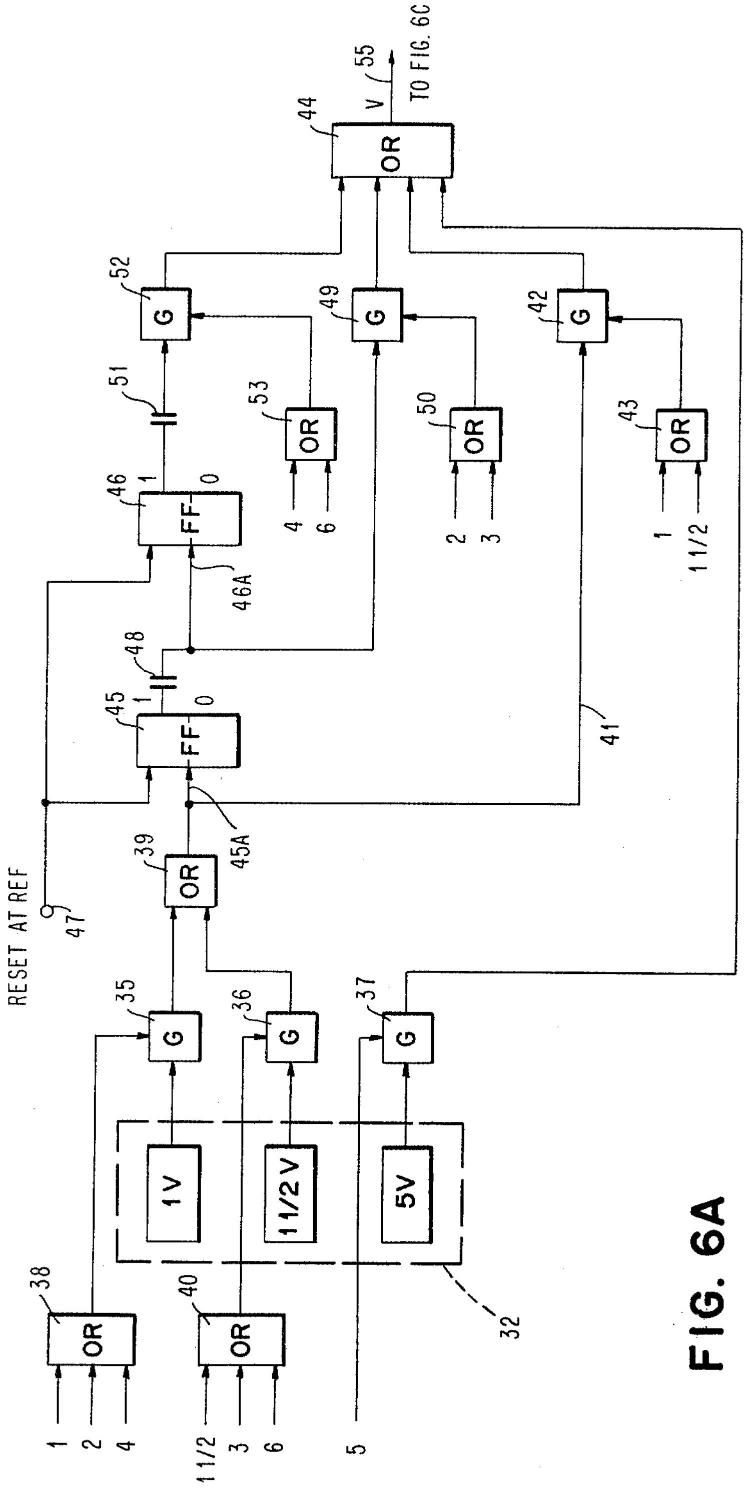
FIG. 6A shows the circuits for developing the horizontal indexing pulses.

Referring now to FIG. 6A, the V-line emitter 32 is shown enclosed in the dotted box and consists of the three individual emitters 1V, 1½V, and 5V each of which emits the requisite pulses as explained above. The section of the appropriate pulses is vested in the gates 35, 36, and 37 which are selectively energized by the format control, either through manually operated switches or by automatic sensing of the format indicia 21. The gate 35 is opened by energization of OR gate 38 by a format linear density control of 1, 2, or 4, to pass pulses from the 1V emitter to OR gate 39. The 1½V emitter is gated to OR gate 39 by application of control signifying a form requiring 1½, 3, or 6 linear magnifications to OR gate 40 to open gate 36. The 5V emitter pulses pass through gate 37 upon application of a 5 linear magnification signal to the gate 37. The OR gate 39 thus receives indexing pulses from either the 1V or 1½V emitter. These pulses, through line 41 are gated through gate 42, by application of "1" or "1½" control to OR gate 43, to OR gate 44 which receives all V indexing pulses and multiples thereof. The 5V pulses are similarly gated to OR gate 44.

The frequency division of the indexing pulses is achieved through use of two complementing triggers 45 and 46, which triggers reverse their stability state upon each successive pulse applied to the terminals **45*a* and 46*a*. These triggers are initially reset to the binary one state by application of a reset pulse to hub 47 with the writing instrument positioned at the reference mark 22 on the document 20 whenever a new form is introduced. The reset phases the triggers 46 and 47 to the newly introduced form. This phase is preserved until a form requiring a different basic magnification is introduced. The trigger 45 is capacitively coupled (via capacitor 48) to the complementing terminal 46*a* so that when (other than on reset) the trigger 45 enters the binary one state this change in state will complement the trigger 46. The capacitor 48 also couples the trigger 45 through gate 49 to OR gate 44 to provide a frequency division of two. Gate 49 opens via OR50** upon a form control of 2 or 3.

A capacitor 51 couples the output of trigger 46 to gate 52 and to OR44 if OR53 is activated by a form control of 4 or 6. Trigger 46 produces a frequency division of 4. Assuming that both triggers are reset as shown, the first pulse from 1V or 1½V will switch trigger 45 to "0." The second pulse will set trigger 45 to "1" and trigger 46 to "0," producing a pulse to gate 49. The third pulse switches trigger 45 to zero and produces no output pulse therefrom. The fourth pulse switches trigger 45 to "1," producing an output pulse to gate 42 and a complementing pulse to switch trigger 46 to "1" producing its output pulse to gate 51. All pulses enter gate 42. Depending on the magnification to be employed one of the gates 42, 49 or 51 together with 35 or 36 will be opened to yield pulses on line 55 representing V lines of the linear scale factor of 1, 1½, 3, 4, or 6. Closure of these gates and opening of gate 37 produces the 5 scale factor signals.

Thus, it will be seen that line 41 contains every V line pulse from the emitters 1U or 1½V. Trigger 45 produces an output on the second, fourth, and all even pulses from OR39, while trigger 46 produces an output on the fourth, eighth, etc., pulses from OR39. The transitions of triggers 45 and 46 are as follows:

| | 45 | 46 |
|---|---|---|
| Reset | 1 | 1 |
| 1st Pulse | 0 | 1 |
| 2nd Pulse | [1] | 0 |
| 3rd Pulse | 0 | 0 |
| 4th Pulse | [1] | [1] |
| 5th Pulse | 0 | 1 |
| 6th Pulse | [1] | 0 |
| 7th Pulse | 0 | 0 |
| 8th Pulse | [1] | [1] |

Thus it will be seen that the requisite frequency division is achieved by the triggers 45 and 46 which yield their outputs for selection by the respective gates.

Figure 6B:
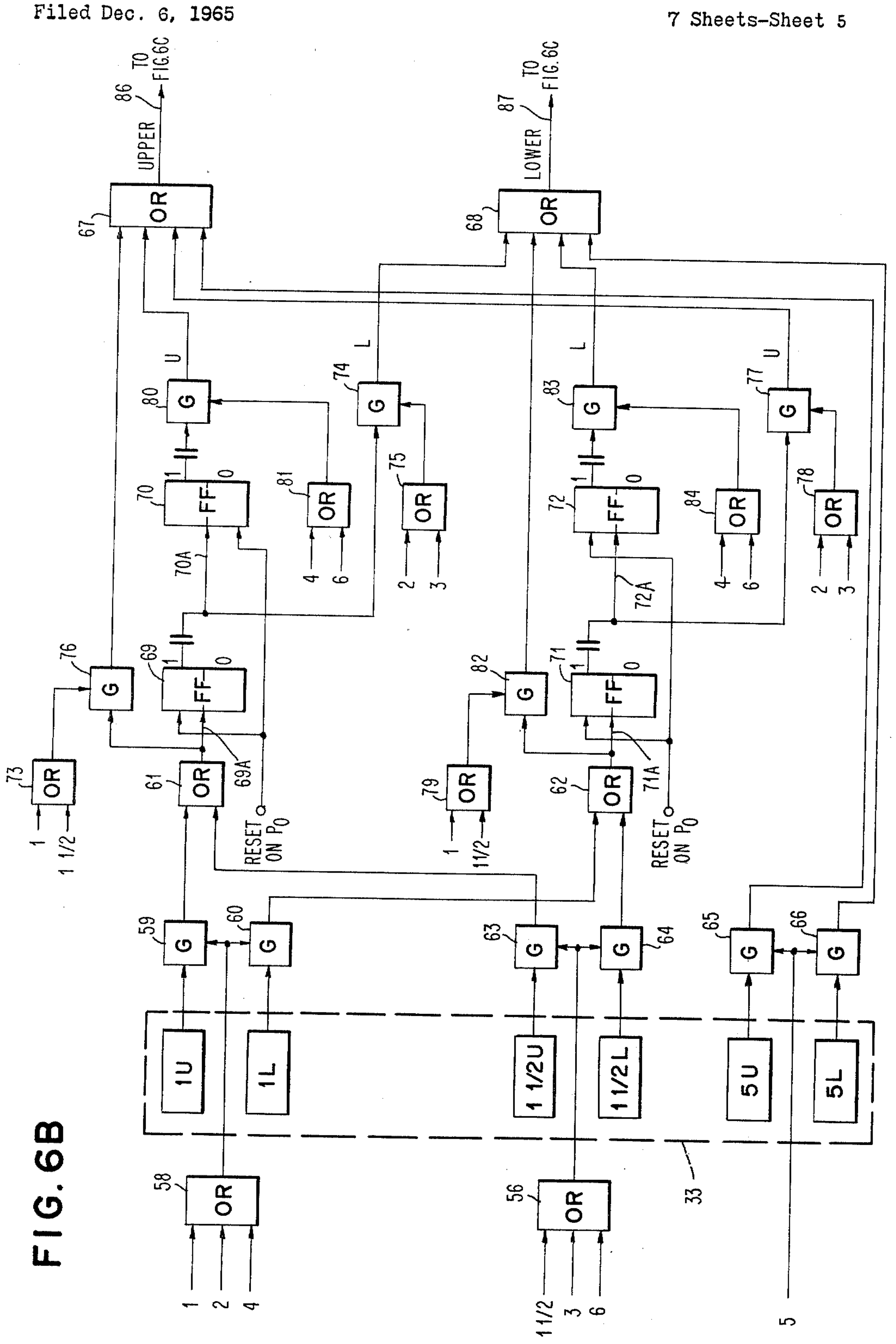
FIG. 6B shows the circuits for developing the vertical indexing pulses.

A similar function for the vertical index lines U and L is performed by the circuits of FIG. 6B. Here, the emitters 1U and 1L for emitting the upper and lower index mark signals are gated via OR58 on a 1, 2, or 4 format size signal and gates 59 and 60 respectively to OR61 (upper) and OR62 (lower). The alternative gating of the 1½ magnification indexing pulses from the 1½U and 1½L emitters are passed via OR56 and gates 63 and 64 to the upper and lower OR gates 61 and 62 as second entries thereto. These alternative entires provide the basic index for either direct entry or for further frequency division. A third direct entry of the 5 times magnification is achieved through gating of upper and lower pulses from emitters 5U and 5L via gates 65 and 66 from a 5 entry thereto. These latter pulses and those derived from 1U, 1½U, 1L and 1½L ultimately appear at OR gates 67 (upper) and 68 (lower).

With a slight difference the basic index pulses from the upper and lower emitters 1U, 1½U, 1L, and 1½L are divided by pairs of coupled triggers 69 and 70, and 71 and 72, much in the fashion of the triggers employed for the indexing lines V in FIG. 6A. The difference lies in the reversal of roles of the upper and lower lines U and L for a double magnification. This occurrence is easily seen with reference to FIG. 5 wherein it will be observed that the first upper index line 1U′ at ¼ density aligns with the full density lower line 1L, and that 2U′ aligns with 3L, and subsequent upper lines align with alternate odd lower lines. Similarly the lower lines 1L′, 2L′, 3L′ align respectively with the upper lines 2U, 4U, and 6U in the full density scale. The same relationship obtains between the ⁴⁄₉ density (1½ magnification) scale and the ⅑ density (3 magnification) scales.

For four magnifications the roles of the upper and lower lines return to correspondency and relates as follows:

1U″=2U    2U″=6U    3U″=10U
1L″=3L    2L″=7U    3L″=10L

To preserve the foregoing relationships, it is necessary in FIG. 6B to reverse the coupling of the outputs from the first triggers 69 and 71 to the utilization circuits. Thus, it will be seen that trigger 69 receives upper pulses but delivers lower pulses, and trigger 71 receives lower pulses and delivers upper pulses upon a frequency division of two. Specifically, OR61 feeds upper pulses to the complementing entry **69*a* of trigger 69 which is capacitively coupled to gate 74 which is opened by a 2 or 3 format control entry to OR75 to pass the former upper (now lower) pulses to the lower output OR gate 68. Similarly, the lower pulses from OR62 enter the complementing entry 71*a* of trigger 71 whose output is capacitively coupled to gate 77, which is opened by a 2 or 3 entry to OR78 to pass the former lower (now upper) pulses to the upper output OR gate 67. Triggers 69 and 71** effect the frequency division of two.

Trigger 69 couples to switch trigger 70 via complementing entry **70*a*, and trigger 71 couples to switch trigger 72 via complementing entry 72*a*, both operating to effect a frequency division of four. Since this magnification requires the original roles of the upper and lower lines trigger 70 is capacitively coupled to gate 80 which is opened from a 4 or 6 entry to OR81 to pass upper pulses to upper output OR gate 67. Trigger 72 is capacitively coupled to gate 83 (opened by a 4 or 6 entry to OR84) which passes lower pulses to OR68**.

To preserve the proper phasing of the upper and lower line significances trigger 69 is reset to "1," trigger 70 reset to "0," trigger 71 reset to "0" and trigger 72 reset to "1," upon application of appropriate reset pulses to the reset hubs 86 and 87 when a different scale document is introduced and the writing instrument is positioned at the document reference mark.

The reset of the triggers 69, 70, 71 and 72 as above set forth implements the required relationships shown in FIG. 5 as follows:

| | 69(L') | | 70(U'') | |
|---|---|---|---|---|
| Reset | 1 | | 0 | |
| 1U | 0 | | 0 | |
| 2U | [1] | 1L' | [1] | 1U'' |
| 3U | 0 | | 1 | |
| 4U | [1] | 2L' | 0 | |
| 5U | 0 | | 0 | |
| 6U | [1] | 3L' | [1] | 2U'' |
| 7U | 0 | | 1 | |
| 8U | [1] | 4L' | 0 | |
| 9U | 0 | | 0 | |
| 10U | [1] | 5L' | [1] | 3U'' |
| 11U | 0 | | | |

| | 71(U'') | | 72(L'') | |
|---|---|---|---|---|
| Reset | 0 | | 0 | |
| 1L | [1] | 1U' | 0 | |
| 2L | 0 | | 0 | |
| 3L | [1] | 2U' | [1] | 1L'' |
| 4L | 0 | | 1 | |
| 5L | [1] | 3U' | 0 | |
| 6L | 0 | | 0 | |
| 7L | [1] | 4U' | [1] | 2L'' |
| 8L | 0 | | 1 | |
| 9L | [1] | 5U' | 0 | |
| 10L | 0 | | 0 | |
| 11L | [1] | 6U' | [1] | 3L'' |

The full density indexing signals from the 1U or 1½U emitters are gated to OR67 by gate 76 energized from a 1 or 1½ format control entry to OR73. A similar gating of the lower indexing signals from 1L or 1½L emitters is achieved by gate 82 energized from OR79 by a 1 or 1½ format control entry.

From the foregoing relationships it will be seen that OR67 will provide the properly phased index pulses on wire 86 for upper line crossings for documents whose format requires a scale of 1, 1½, 2, 3, 4, 5, or 6 either directly or through frequency division. Similarly, OR68 produces the requisite lower line indexing pulses on line 87 in timed relationship with the passage of the writing instrument 25 over the L lines on the document.

Figure 6C:
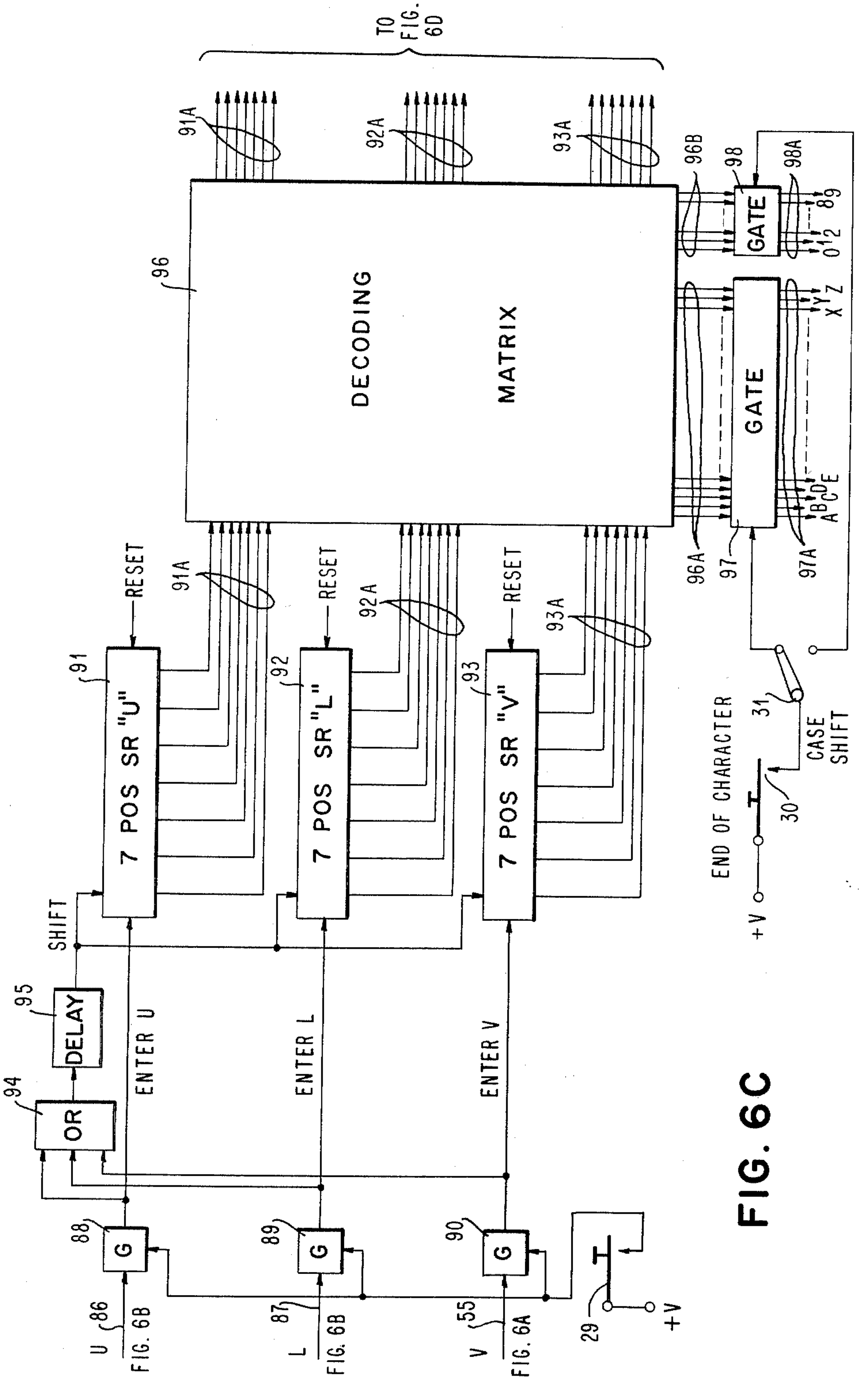
FIG. 6C shows the circuits for storing the sequence of horizontal and vertical line crossings and for decoding these pulses into character signals.

The V line crossing signals (FIG. 6A) appearing on line 55, and the U and L line crossing signals (FIG. 6B) appearing on lines 86 and 87 are entered in shift registers in FIG. 6C in the following manner. The signals representing the respective line crossings U, L, and V appear on the lines 86, 87 and 55 as the writing instrument 25 is moved about over the document in both writing and non-writing position, and continuously manifest the position of the instrument relative to the document marks 10. However, since these signals provide the reference for character identification, it is necessary that they be entered into the analysis circuitry only when the writing instrument 25 is in writing contact with the document surface. Therefore, the pressure switch 29 in the writing instrument, closed upon writing contact, closes gates 88, 89 and 90 to pass the line crossing signals only when writing is being effected. Thus, the U signals appearing on line 86 are passed by gate 88 to shift register 91. The L signals are passed to shift register 92, and the V signals are passed to shift register 93. These signals do not occur simultaneously, but sequentially in the order of the crossings and are entered into the corresponding registers as a binary "1." Following entry into one of the registers the OR gate 94 through delay 95 effects a one order shift of all entries in all shift registers. The shift registers 91, 92, and 93 are seven order shift registers to accommodate the potential seven maximum number of line crossings (W for example). Thus, for a seven line crossing, seven entries and seven shifts will be entered in the shift registers. For a lesser number of crossings (I, for example) a lesser number of entries and shifts will be effected. Consequently, only the left end of the registers will be changed, the orders to the right remaining at the reset status of binary "0." When the formation of the character is complete and the registers 91, 92, and 93 are loaded with the requisite information, the lines 91*a*, 92*a*, and 93*a* will manifest the stored data in the respective shift registers by the relativity of the potentials thereon manifested as binaries (presence or absence). These twenty-one lines enter a conventional diode matrix 96 where the combinations of the presence and absence of potential levels on the lines 91*a*, 92*a*, and 93*a* are combined to produce a unique output response on one of the lines 96*a* and possibly one of the lines 96*b* (depending on the conflict between certain alphabetic and numeric characters). If the characters are alphabetic the end of character switch 30 is closed by the operator to pass a gating pulse through the non-actuated case shift switch 31 to open gate 97 to pass the alphabetic character signal through on one of the twenty-six lines 97*a*. If the character is numeric and case shift switch 31 depressed, the gating pulse is transferred to gate 98 to activate one of the ten numeric lines 98*a*.

The lines 97*a* and 98*a* which identify the completed character may be connected to a recorder or to a data transmission link for direct entry to a computer. To insure the integrity of the character formation these lines may be connected to a character display apparatus within the operator's view so that the accuracy of the formation of the character may be checked before it is permitted to be transmitted. The end of character switch 30 initiates a slight delay to permit transmission of the character identification and then resets the shift registers 91, 92, and 93 in preparation for a new character. The frequency dividing triggers are only reset upon introduction of a form of a different scale from the preceding form.

Figure 6D:
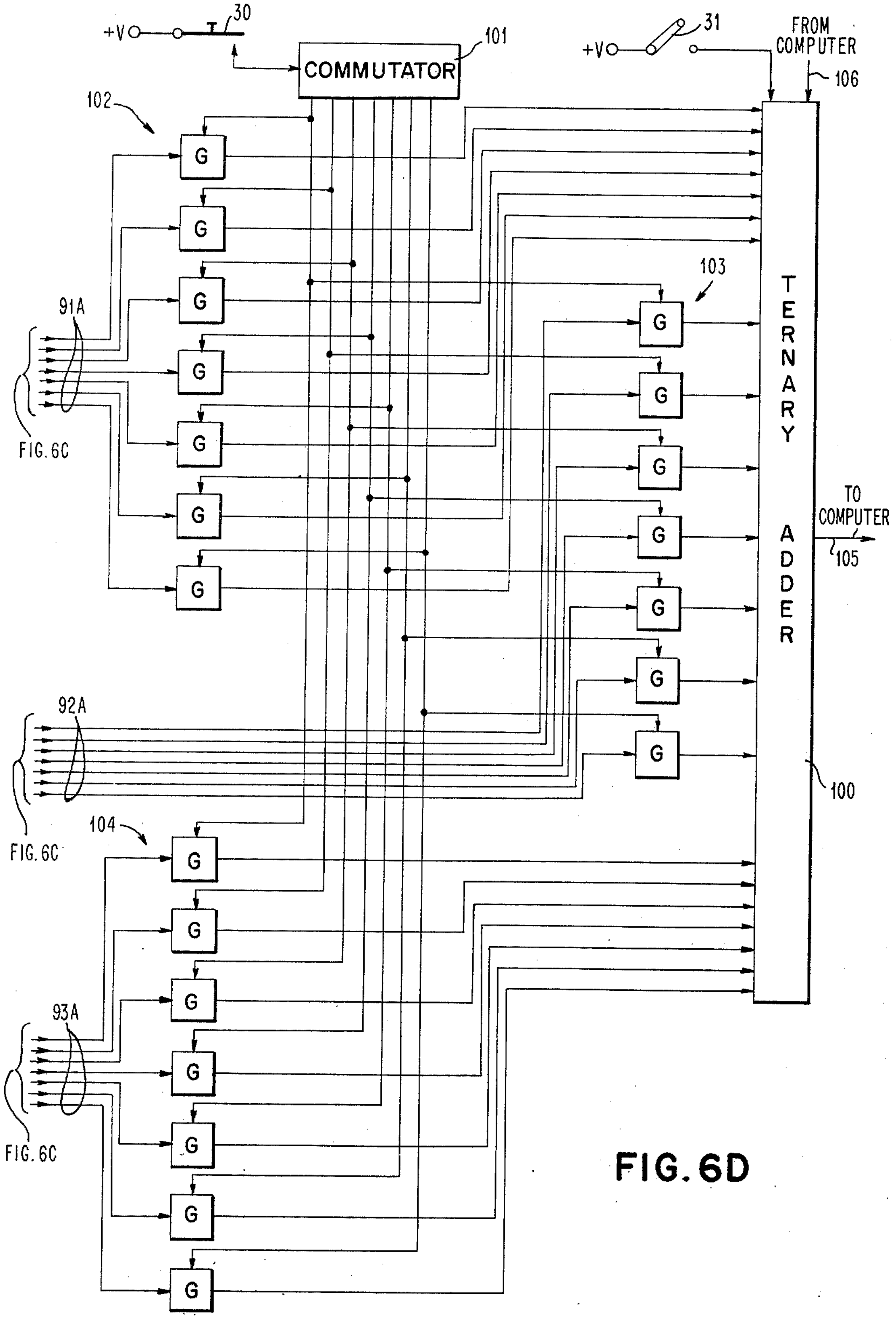
FIG. 6D shows the circuits for adding the ternary representations to obtain decimal identifications of the characters drawn.

The shift register output lines 91*a*, 92*a*, and 93*a* (FIG. 6C) may alternatively be connected (FIG. 6D) to a ternary adder 100. The lines 91*a*, 92*a*, and 93*a* which contain the information stored in the shift registers 91, 92, and 93 are sequentially gated into the ternary adder 100 by pulses supplied by commutator 101 which is activated by the end of character switch 30 to produce seven pulses which sequentially open a triplet of gates, one gate in each of the series 102, 103, and 104. Each gate when opened passes the representation of the ternary "0," "1," or "2" to the ternary adder 100. The first entry enters the ternaries from the seventh orders of the three shift registers into the adder. The second pulse enters the contents of the sixth order etc. The ternary adder produces the arithmetic sum of the equivalent decimal value of each ordered ternary value as shown in the table of values supra. This numerical value is transmitted to the computer on line 105 (preferably serially) upon computer command on line 106. The computer accepts the numerical value thus transmitted and performs a table lookup operation to identify the character formed. The case shift switch 31 resolves any ambiguity between alphabetic and numeric characters as set forth hereinabove.

From the foregoing explanation of the apparatus, it will be seen that the sequence of line crossings are assigned weighted values which greatly increases the number of definitive expressions for a character formed with respect to a simple grid of only three lines. Additionally, through use of externally disposed line crossing detectors which are coordinated with the movement of the writing instrument, a human readable handwritten document with electrically variable format can be prepared concurrent with the generation of the character identification signals. Through use of additional counters the absolute coordinates of the writing instrument may be further established to produce automatic case shift control in those areas of the document wherein only numeric characters are to be written.

While the invention has been particularly shown and described with reference to preferred embodiments thereof, it will be understood by those skilled in the art that various changes in form and details may be made therein without departing from the spirit and scope of the invention.

What is claimed is:

1. Apparatus for analyzing a handwritten lexical symbol written in a predetermined sequence of strokes upon a document form having a grid of preprinted character defining geometric patterns consisting of N intersecting horizontal and vertical lines upon which the symbols are drawn with the patterns as a guide comprising:

(a) means for fixing said document form in a predetermined orientation relative to the apparatus;

(b) a writing instrument for forming the lexical symbols;

(c) motion repeating means attached to the writing instrument for repeating the orthogonal movements of the writing instrument over the document page;

(d) line crossing detector means coacting with said motion repeating means for emitting an electrical impulse upon each separate crossing of the N lines by the writing instrument;

(e) N registers operable to store the respective line crossings of each different one of the N lines constituting the character defining geometric patterns;

(f) means responsive to writing pressure of the writing instrument upon the document for gating each line crossing signal to its respective corresponding storage register, and for shifting the storage in all said registers one storage position upon completion of entry in any one of said N registers;

(g) and means responsive to the completion of the formation of lexical symbol for decoding the contents of said registers and producting a character identification signal manifestive of the contents of said registers.

2. The apparatus of claim 1, wherein:

(a) N=3;

(b) the grid of preprinted geometric symbol defining patterns consists of spaced columns and rows of patterns each consisting of a vertical line crossed by two horizontal lines;

(c) three registers store the respective crossings of the upper and lower of the horizontal lines and of the vertical line as the character is stroked.

3. The apparatus of claim 2 wherein the line crossing detector means comprises a vertical line crossing emitter and a horizontal line crossing emitter connected to move synchronously with the respective orthogonal movements of the writing instrument and operable to produce separate electrical impulses upon each crossing of the upper horizontal line, the lower horizontal line, and the vertical line as the writing instrument moves over these respective lines in the grid of patterns for a document of a given grid spacing.

4. The apparatus of claim 3, including further:

(a) means for selectively gating every M'th pulse from said vertical line crossing emitter and said horizontal line crossing emitter, where M is an integer greater than one, to the respective ones of said three registers when the preprinted document form has a grid wherein the spacing between the columns and rows of geometric patterns is equal to M times the spacings of the given grid spacing.

5. The apparatus of claim 1 wherein said means responsive to the completion of the formation of a lexical symbol, for decoding the contents of said registers and producing a character identification signal manifestive of the symbol, includes an adder operating in the radix N and operable to add the contents of said registers in the radix N.

6. A method of producing a polynomial expression which is uniquely definitive of a lexical symbol drawn by hand in a predetermined sequence of line crossings upon a preprinted guide pattern having N lines, comprising:

(a) assigning values of 0; 1; 2 . . . N–2; N–1; respectively to each of said lines;

(b) detecting the sequence of the crossings of each of said lines, as said symbol is written in the predetermined sequence of line crossings upon said pattern as a guide;

(c) selecting weighted derived values for each line crossing as a function of the line crossed and the relative sequence of the crossing from respective ones of the N series of weighted values, wherein (1) weighted values of crossings of the line having the assigned value of zero is selected from a series consisting of all zeros, (2) weighted values of crossings of the line having the assigned value of one is selected from the series consisting of 1; N; $N^2$; $N^3$ . . . $N^{C-2}$; $N^{C-1}$, where C is equal to the maximum number of line crossings required to form any symbol in the set for which the polynomial expression is to be derived, (3) weighted values of the crossings of the line having the assigned value of two is selected from the series consisting of 2; 2N; $2N^2$; $2N^3$ . . . $2N^{C-2}$; $2N^{C-1}$, (4) weighted values of the crossing of the line having the assigned value (N–2) is selected from the series consisting of (N–2); (N–2)N; $(N-2)N^2$ . . . $(N-2)N^{C-1}$, (5) weighted values of the crossings of line having the assigned value of (N–1) is selected from the series consisting of (N–1); (N–1)N; $(N-1)N^2$ . . . $(N-1)N^{C-1}$, (d) and adding the component weighted values, one only from each corresponding position in the respective series, to obtain the derived polynomial expression which is definitive of the drawn symbol.

7. Apparatus for analyzing a handwritten lexical symbol in a given set of symbols as the symbol is handwritten in a predetermined sequence of stroke line crossings upon a document form, having equally spaced columns and rows of preprinted character forming patterns, each pattern consisting of a vertical line crossed by an upper and lower horizontal line, comprising:

(a) means for fixing the document in a predetermined orientation relative to the apparatus;

(b) a writing instrument for forming the lexical symbols and having a pressure sensitive switch therein operable to be closed when the instrument is in writing contact with the document;

(c) a motion repeating means attached to said writing instrument, and operable to repeat the movements of said instrument at a location removed from said document as the instrument is moved in a plane parallel to the document surface;

(d) line crossing detectors connected to said motion repating means and having an emitter for emitting electrical impulses upon each crossing of the vertical lines in each of said patterns, an emitter for emitting electrical impulses upon each crossing of the upper horizontal line in each of said patterns, and an emitter for emitting electrical impulses upon each crossing of the lower horizontal line in each of said patterns;

(e) three shift registers for storing the line crossings of said vertical line and said horizontal lines;

(f) means under control of said pressure sensitive switch for gating the electrical impulses from each of said emitters to the corresponding shift register and for shifting the contents of all shift registers upon completion of entry into one register;

(g) a decoding circuit connected to said shift registers and operable responsive to the combined storage content thereof to produce an output response manifestive of the identity of the drawn symbol;

(h) and a switch operable upon completion of the formation of the symbol to gate the output response of said decoding circuit.

8. The apparatus of claim 7 wherein the motion repeating means comprises a pantograph linkage and an orthogonal displacement resolver for resolving the movements of the writing instrument into component horizontal and vertical displacements; and said line crossing detectors comprise a disc rotated synchronously with the vertical movement of said motion repeating means, a disc rotated synchronously with the horizontal movement of said motion repeating means, the said discs having spaced markings to define the respective line crossings and photocell means coacting with said discs to produce the signals measuring the respective line crossings.

9. The apparatus of claim 8 further including three pairs of triggers for providing a frequency division of one-half and one-fourth for each of the vertical, upper and lower horizontal line crossing signals for document forms having magnifications in the size and spacings of the said patterns of twice and four times.

10. The apparatus of claim 7 wherein said decoding circuit includes a ternary adder for converting the contents of said registers to a decimal number which is the sum of the component values selected by the sequence of line crossing from the equivalent decimal values in the ternary series.

References Cited

UNITED STATES PATENTS

| | | | |
|---|---|---|---|
| 3,108,254 | 10/1963 | Dimond | 178—18 |
| 3,111,646 | 11/1963 | Harmon | 178—18 |
| 3,112,362 | 11/1963 | Pecker | 178—18 |
| 3,127,588 | 3/1964 | Harmon | 178—18 |
| 3,133,266 | 5/1964 | Frishkopf | 178—18 |
| 3,142,039 | 7/1964 | Irland | 178—18 |
| 3,199,078 | 8/1965 | Gaffney | 178—18 |

MAYNARD R. WILBUR, Primary Examiner

H. I. PAUL, Assistant Examiner

U.S. Cl. X.R.

178—18